United States Patent
Tai et al.

(10) Patent No.: US 9,664,837 B2
(45) Date of Patent: May 30, 2017

(54) LIGHT EMISSION MODULE AND LIGHT GUIDE PLATE AND MANUFACTURING METHOD THEREOF

(71) Applicant: Darfon Electronics Corp., Taoyuan County (TW)

(72) Inventors: Hung-Yu Tai, Taoyuan County (TW); Hsin-Cheng Ho, Taoyuan County (TW)

(73) Assignee: Darfon Electronics Corp., Taoyuan (TW)

( * ) Notice: Subject to any disclaimer, the term of this patent is extended or adjusted under 35 U.S.C. 154(b) by 28 days.

(21) Appl. No.: 14/940,197

(22) Filed: Nov. 13, 2015

(65) Prior Publication Data

US 2016/0139317 A1 May 19, 2016

(30) Foreign Application Priority Data

Nov. 19, 2014 (TW) .............................. 103140134 A

(51) Int. Cl.
*F21V 8/00* (2006.01)
*H01H 13/83* (2006.01)

(52) U.S. Cl.
CPC .......... *G02B 6/0021* (2013.01); *G02B 6/0091* (2013.01); *H01H 13/83* (2013.01); *G02B 6/0065* (2013.01); *G02B 6/0068* (2013.01)

(58) Field of Classification Search
CPC .. G02B 6/0021; G02B 6/0091; G02B 6/0065; G02B 6/0068; H01H 13/83
USPC ................ 362/555, 558, 611, 612, 613, 621
See application file for complete search history.

(56) References Cited

U.S. PATENT DOCUMENTS

| 7,067,753 B1* | 6/2006 | Cheng .................... H01H 13/83 200/310 |
| 7,407,314 B2 | 8/2008 | Hsu et al. |
| 8,830,407 B2 | 9/2014 | Sasaoka et al. |
| 2006/0203511 A1* | 9/2006 | Tseng ................... G02B 6/0016 362/608 |

(Continued)

FOREIGN PATENT DOCUMENTS

| CN | 2745289 Y | 12/2005 |
| CN | 100518207 C | 2/2007 |

(Continued)

OTHER PUBLICATIONS

Office action of counterpart application by China IP Office on Feb. 15, 2016.

(Continued)

*Primary Examiner* — Laura Tso

(57) ABSTRACT

A light emission module and a light guide plate and a manufacturing method thereof are provided. The light guide plate is configured to guide the light received and has a first lateral surface and a tongue extending from the first lateral surface toward a light source. The tongue has a flat end surface that faces or engages with the light source. The light guide plate receives the light emitted from the light source by the flat end surface, so as to reduce or eliminate the gap between the light source and the light guide plate. Therefore, the loss of light energy during the light traveling in air is effectively reduced, and the intensity of light received by the light guide plate from the light source meets expectation, improving the lighting effect of the light emission module.

20 Claims, 8 Drawing Sheets

(56) References Cited

U.S. PATENT DOCUMENTS

| | | | | |
|---|---|---|---|---|
| 2007/0008739 | A1* | 1/2007 | Kim | G02B 6/0021 362/612 |
| 2007/0062793 | A1 | 3/2007 | Hung | |
| 2010/0008102 | A1* | 1/2010 | Huang | G02B 6/002 362/612 |
| 2010/0302801 | A1* | 12/2010 | Lin | G02B 6/0018 362/606 |
| 2012/0026751 | A1* | 2/2012 | Lin | G02B 6/0021 362/611 |
| 2012/0163029 | A1* | 6/2012 | Tsai | G02B 6/0021 362/613 |
| 2012/0275193 | A1* | 11/2012 | Yoshida | G02B 6/0083 362/613 |
| 2015/0131320 | A1* | 5/2015 | He | G02B 6/0011 362/612 |

FOREIGN PATENT DOCUMENTS

| | | |
|---|---|---|
| CN | 1932556 A | 3/2007 |
| CN | 2886780 Y | 4/2007 |
| CN | 101900281 A | 12/2010 |
| CN | 201741102 U | 2/2011 |
| CN | 201945958 U | 8/2011 |
| CN | 103836436 A | 6/2014 |
| EP | 1724801 A | 11/2006 |
| TW | 201316092 A | 4/2013 |
| TW | M482920 A | 7/2014 |
| TW | M496840 A | 3/2015 |

OTHER PUBLICATIONS

Office action of counterpart application by TW IP Office on Dec. 24, 2015.

* cited by examiner

LIGHT EMISSION MODULE AND LIGHT GUIDE PLATE AND MANUFACTURING METHOD THEREOF

BACKGROUND OF THE INVENTION

1. Field of the Invention

The present invention generally relates to a light emission module and a light guide plate and a manufacturing method thereof. Particularly, the present invention relates to a light emission module and a light guide plate and a manufacturing method thereof that can reduce the loss of light energy.

2. Description of the Prior Art

The current backlit keyboard, from top to bottom, may include a set of keys, a mask, a light guide plate, a light source, and a reflector. The set of keys include multiple keycaps formed of light-transparent material. In general, the light source is composed of multiple light-emitting elements and the light-emitting diode (LED) is usually selected as the light source for the backlit keyboard. The light guide plate receives light emitted from the light source and the light is then emitted toward the set of keys by guidance and scattering of the light guide plate. In addition, the mask is disposed over the light guide plate and formed with light-penetrable portions corresponding to the keycaps. The light traveling within the light guide plate can be emitted out of the keycap through the corresponding light-penetrable portion, so that the symbol on the keycap can be identified.

Due to the limitation of soldering accuracy of the surface-mount-technology (SMT) equipment, the actual position of the light-emitting element soldered on the circuit board usually shifts from the preset position, so that the through hole of the light guide plate must have sufficient space for allowing the shifted light-emitting element to pass therethrough. As such, the gaps between each of the light-emitting elements and the light guide plate are different. Because of the exist of gap, a portion of light from the light-emitting element will transmit to non-light guide plate portions, such as the mask, resulting in the loss of light energy caused by the absorption and scattering of light. Therefore, the actual amount of light received by the light guide plate is less than what is expected. Moreover, due to the gaps of different sizes, the intensity of light to different directions from the light guide plate will be non-uniform.

For example, in the case of two rows of light sources disposed on the center of the keyboard to respectively emit lights toward the left side and the right side of the keyboard, when the gaps between the light sources that emit lights to the left half keyboard and the light guide plate are smaller and the gaps between the light sources that emit lights to the right half keyboard and the light guide plate are larger, the left half keyboard will be significantly brighter than the right half keyboard. Consequently, the brightness in the left half keyboard and the right half keyboard is non-uniform, impairing the viewing experience of the user.

Therefore, how to reduce the loss of light energy from the gap between the light source and the light guide plate to improve the lighting effect of the backlit keyboard is a challenging issue.

SUMMARY OF THE INVENTION

In view of the prior arts, it is an object of the present invention to provide a light emission module. In one embodiment, the light emission module includes a light source, a circuit board, and a light guide plate. The light source has a light emission surface for emitting light and is disposed on the circuit board. The light guide plate has a through hole for accommodating the light source, wherein the through hole has an edge facing the light emission surface. The tongue extends from the edge toward the light emission surface and has a flat end surface, wherein a width of the flat end surface is smaller than a width of the light emission surface of the light source. The flat end surface faces a middle portion of the light emission surface of the light source and is configured to receive the light emitted from the middle portion of the light emission surface.

In another embodiment, the present invention provides a light emission module, which is disposed under a light-transmissive object and includes a light source, a circuit board, and a light guide plate. The light source has a light emission surface. The circuit board has a preset disposition area for disposing the light emission surface of the light source. The preset disposition area has a first boundary and a second boundary. The light guide plate guides the light received to emit toward the light-transmissive object. The light guide plate is disposed between the circuit board and the light-transmissive object and has a through hole and a tongue. The through hole is provided for accommodating the light source and has an edge, wherein the edge faces the light emission surface and is aligned with the first boundary of the preset disposition area. The tongue extends from the edge along a direction from the first boundary toward the second boundary to overlap the preset disposition area. The tongue has a flat end surface, wherein the width of the flat end surface is smaller than the width of the light emission surface of the light source, and the flat end surface faces the middle portion of the light emission surface of the light source to receive light emitted from the middle portion of the light emission surface.

The present invention further provides a light emission module, which is disposed under a light-transmissive object and includes a circuit board, a light source, and a light guide plate. The light source is disposed on the circuit board. The light source has a light emission surface, which is flat and emits light. The light guide plate guides the light received to emit toward the light-transmissive object and is disposed between the circuit board and the light-transmissive object. The light guide plate has a through hole and a tongue. The through hole has a first lateral surface and a second lateral surface opposite to each other. The tongue extends from the first lateral surface to the second lateral surface. The tongue has a flat end surface at a tail end. The light source is disposed in the through hole. The width of the flat end surface is smaller than the width of the light emission surface. The first lateral surface has a first distance from the light emission surface. The flat end surface faces the middle portion of the light emission surface and receives the light emitted from the light emission surface. The distance between the flat end surface and the light emission surface is smaller than the first distance between the first lateral surface and the light emission surface, so that the distance of the light emitted from the middle portion of the light emission surface traveling in air to the light guide plate is smaller than the first distance.

The present invention further provides a method of manufacturing a light emission module. The method includes the following steps: preparing a circuit board; disposing a light source on the circuit board, the light source having a light emission surface; preparing a light guide plate to be located over the circuit board, the light guide plate having a first lateral surface and a tongue, the first lateral surface facing the light emission surface, the tongue protruding from the first lateral surface and having a flat end surface with a width smaller than a width of the light emission surface of the light source; and assembling the circuit board and the light guide plate, so that a middle portion of the light source faces the flat end surface of the tongue of the light guide plate.

The present invention further provides a method of manufacturing a light emission module, which includes the following steps: preparing a circuit board having a preset disposition area with a first boundary and a second boundary; preparing a light source having a light emission surface disposed within the preset disposition area; preparing a light guide plate located over the circuit board, the light guide plate disposed with a through hole for accommodating the light source and a tongue extending along a direction from the first boundary toward the second boundary to overlap the preset disposition area, wherein the through hole has an edge that faces the light emission surface and is aligned with the first boundary of the preset disposition area, and the tongue has a flat end surface with a width smaller than a width of the light emission surface of the light source; and assembling the circuit board and the light guide plate, so that a middle portion of the light source faces the flat end surface of the tongue of the light guide plate.

In another embodiment, the present invention provides a light guide plate including a plate body having a first side and a second side opposite to each other, the plate body having a through hole formed close to the first side and the through hole having a first edge; and a tongue extending from the first edge and away from the second side, wherein the tongue has a flat end surface and the flat end surface is closer to the first side than the first edge is.

Comparing to the prior arts, the light guide plate of the invention has the tongue that extends toward the light emission surface of the light source; the tongue has the flat end surface that faces the light emission surface of the light source, so that the flat end surface of the tongue is close to or engages with the light emission surface to receive the light emitted from the light emission surface. As such, the distance for the light from the light source traveling in air to the light guide plate can be reduced and the loss of light energy can be improved. Therefore, the intensity of light that is emitted from the light source and then received by the light guide plate will meet expectation, and the overall lighting effect of the light emission module is promoted.

DETAILED DESCRIPTION OF THE PREFERRED EMBODIMENT

Figure 1:
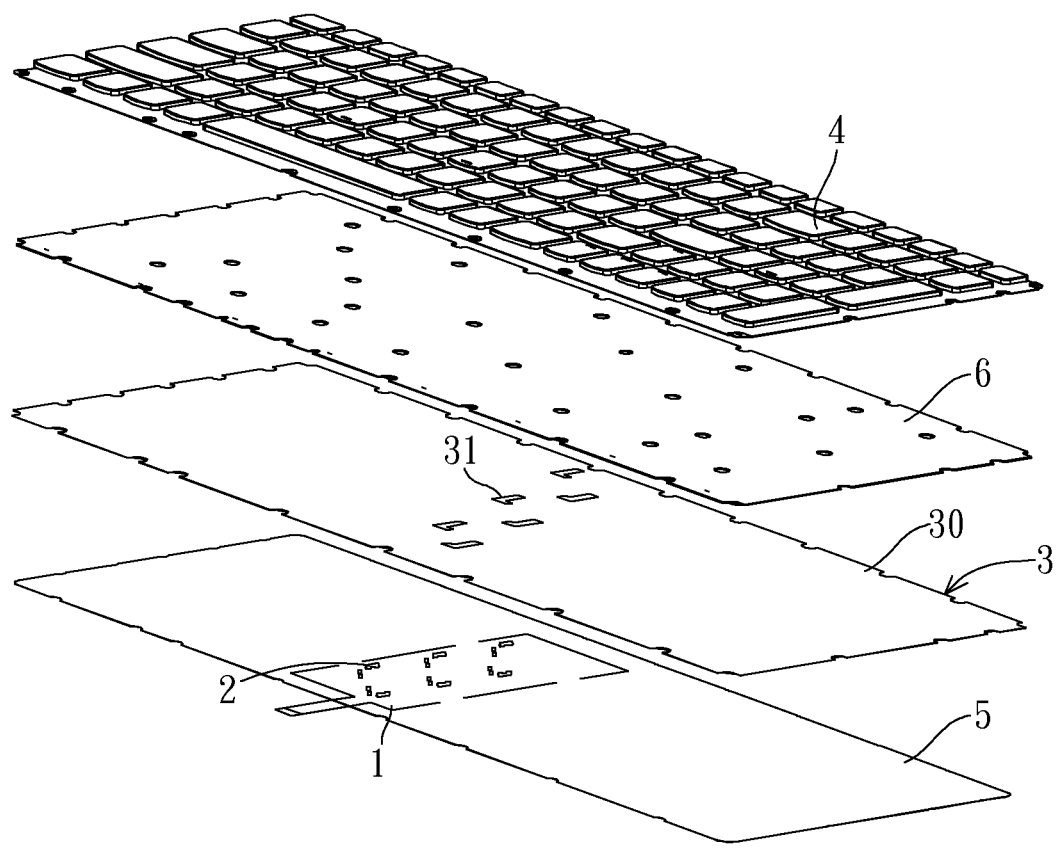
FIG. 1 is an exploded view of a first embodiment of the light emission module of the invention, wherein the light source is disposed in the through hole at the middle portion of the light guide plate.

The advantages and spirit of the invention can be further understood in view of the detailed descriptions and the accompanying drawings. The present invention can be implemented or applied to other different embodiments. Certain aspects of the present invention are not limited by the particular details of the examples illustrated herein. Without departing from the spirit and scope of the invention, the present invention will have other modifications and changes. It should be understood that the appended drawings are not necessarily drawn to scale and the relative position is merely illustrative, not presenting an actual condition of the embodiments.

In order to solve the problem of light energy loss of the backlit keyboard, the present invention provides a light emission module, which can be disposed under the keycaps of the backlit keyboard, wherein the keycap lets light pass through and refers as a light-transmissive object. The light emission module provides light to the light-transmissive object, allowing the light to shine through symbols of the light-transmissive object.

Referring to FIG. 1 to FIG. 13, embodiments of the light emission module of the present invention are shown. As shown in FIG. 1 to FIG. 5, the light emission module of the present invention mainly includes a circuit board 1, a plurality of light sources 2, and a light guide plate 3. Each light source 2 is disposed on the circuit board 1 and has a flat light emission surface 21 for emitting light toward the light guide plate 3. The light guide plate 3 is disposed between the circuit board 1 and the light-transmissive object 4 and configured to receive the light and guide the light to emit toward the light-transmissive object 4. The light guide plate 3 has a plurality of through holes 31, wherein the through holes 31 are provided for accommodating the light sources 2 therein when the light guide plate 3 and the circuit board 1 are assembled. The through hole 31 has a first edge 311 that faces the light emission surface 21. Optionally, the light emission module of the invention may further include a reflective sheet 5 and a mask sheet 6 as those included in the prior art, which are disposed on the lower side and the upper side of the light guide plate 3, respectively.

Figure 5:
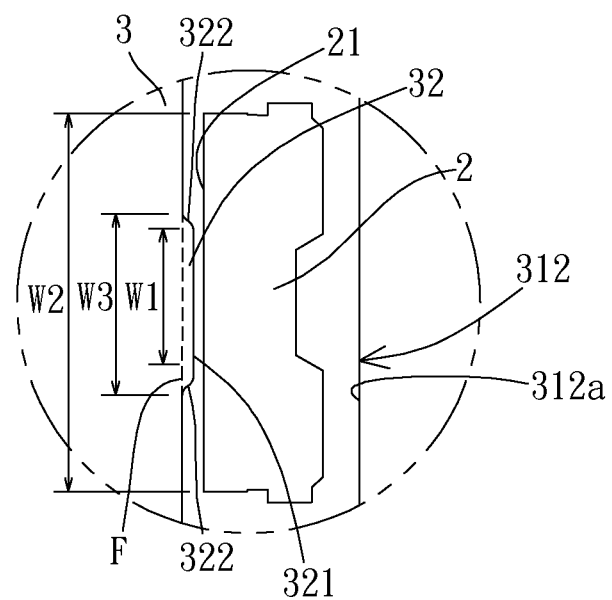
FIG. 5 is an enlarged view of the area "C" of FIG. 4, showing the dimension relationship between the light emission surface of the light source and the tongue of the light guide plate.

The light guide plate 3 further has a tongue 32, wherein the tongue 32 extends from the first edge 311 toward the light emission surface 21 of the light source 2. The tongue 32 has a flat end surface 321. Preferably, as shown in FIG. 5, the width "W1" of the flat end surface 321 is smaller than the width "W2" of the light emission surface 21. The flat end surface 321 faces a middle portion of the light emission surface 21 of the light source 2 and is configured to receive the light emitted from the middle portion of the light emission surface 21.

Due to the precision limitation of the surface mount technology (SMT) equipment, the actual position of the light source 2 soldered onto the circuit board 1 usually shifts from the preset position. Therefore, as shown in FIG. 9A to FIG. 10C, the circuit board 1 has a preset disposition area 11. When the edge of the through hole 31 is designed to be aligned with the boundary of the preset disposition area 31, provided that the light emission surface 21 of the light source 2 falls on the preset disposition area 11, the light source 2 can smoothly enter the through hole 31 as the circuit board 1 is later assembled with the light guide plate 3 and the light emitted from the light source 2 can smoothly enter the light guide plate 3.

In the invention, the preset disposition area 11 is defined with a first boundary 111 and a second boundary 112. The though hole 31 is defined with the first edge 311 and a second edge 312 opposite to each other, wherein the first edge 311 faces the light emission surface 21 of the light source 2 and is aligned with the first boundary 111 of the preset disposition area 11. In other words, the through hole 31 is defined with a first lateral surface 311a and a second lateral surface 312a, wherein the first lateral surface 311a is a lateral surface on the first edge 311, and the second lateral surface 312a is a lateral surface on the second edge 312 opposite to the first lateral surface 311a. The first lateral surface 311a and the second lateral surface 312a extend along the direction that the through hole 31 penetrates through the plate body 30, wherein the first lateral surface 311a faces the light emission surface 21 and is more preferably parallel to the light emission surface 21. That is, the first lateral surface 311a and the second lateral surface 312a are the sidewalls of the through hole 31. In this embodiment, the tongue 32 of the light guide plate 3 extends along a direction from the first boundary 111 toward the second boundary 112 laterally to enter the preset disposition area 11. That is, the tongue 32 protrudes from the first edge 311 toward the second edge 312 to overlap the preset disposition area 11. Specifically, the tongue 32 extends from the first lateral surface 311a toward the second lateral surface 312a. Optionally, the distance between the first boundary 111 and the second boundary 112 of the preset disposition area 11 is between 0.18 mm and 0.2 mm.

Figure 4:
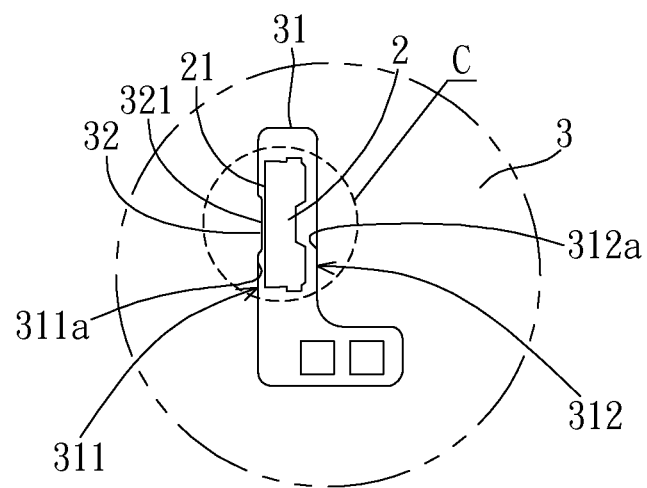
FIG. 4 is an enlarged view of the area "B" of FIG. 2, showing the relative position of the light source and the through hole of the light guide plate on the left side.

As shown in FIG. 4 and FIG. 5, the tongue 32 has the flat end surface 321 at its tail end, wherein the flat end surface 321 is preferably parallel to the light emission surface 21. In principle, the width "W1" of the flat end surface 321 is smaller than the width "W2" of the light emission surface 21 of the light source 2. The flat end surface 321 faces the middle portion of the light emission surface 21 of the light source 2 and is configured to receive light emitted from the middle portion of the light emission surface 21. The tongue 32 can be a quadrilateral, wherein the flat end surface 321 is on the top side of the tongue 32 (i.e. the right side of the tongue 32 shown in FIG. 5) and parallel to the first lateral surface 311. The bottom side of the tongue 32 (i.e. the dotted line indicated by symbol "F" in FIG. 5) is connected to the first edge 311. That is, the bottom side "F" of the tongue 32 is connected to the first lateral surface 311a. Preferably, the tongue 32 is a trapezoid to match the radial path of the light from the middle portion of the light source 2, so as to increase the light transmission effect. The flat end surface 321 is on the top side of the tongue 32 (i.e. the right side of the tongue shown 32 in FIG. 5); the bottom side of the tongue 32 (i.e. the dotted line indicated by symbol "F" in FIG. 5) is connected to the first edge 311 (i.e. the first lateral surface 311a), wherein the tongue 32 has two lateral sides 322; each lateral side 322 outwardly expands from the flat end surface 321 toward the first lateral surface 311a so that the width "W3" of the bottom side of the tongue 32 (i.e. the dotted line indicated by symbol "F" in FIG. 5) that connects the first lateral surface 311a is larger than the width "W1" of the flat end surface 321 to construct the profile of a trapezoid.

In the first embodiment of FIG. 1 to FIG. 5, the light guide plate 3 has a plurality of through holes 31 at the middle portion. The through holes 31 can be divided into a right group (e.g. three through holes are in the right group in FIG. 2) and a left group (e.g. three through holes are in the left group in FIG. 2). In general, the through holes in the left group are located on the left side of the through holes in the right group.

Figure 2:
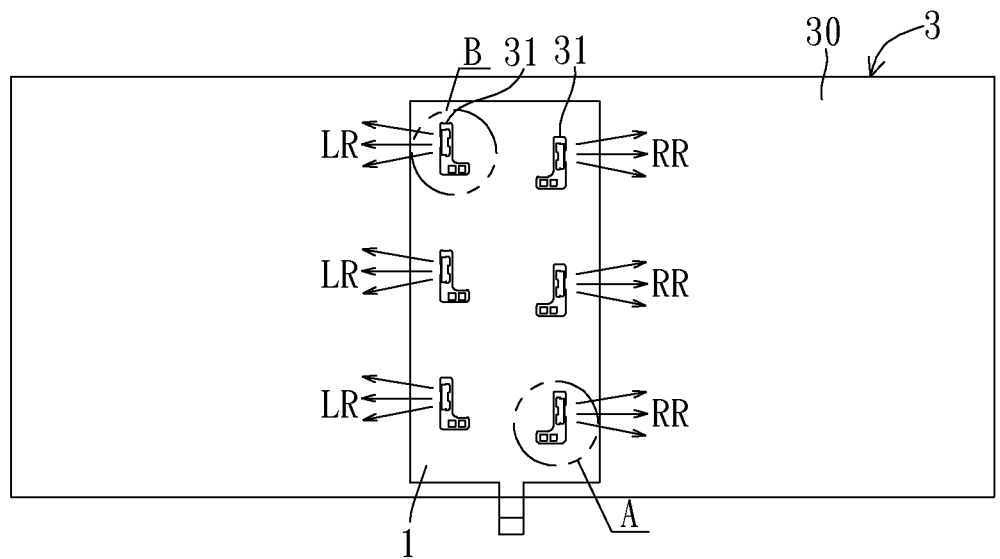
FIG. 2 is a schematic view of the first embodiment of the light emission module of the invention, showing the light source penetrating into the light guide plate.
Figure 3:
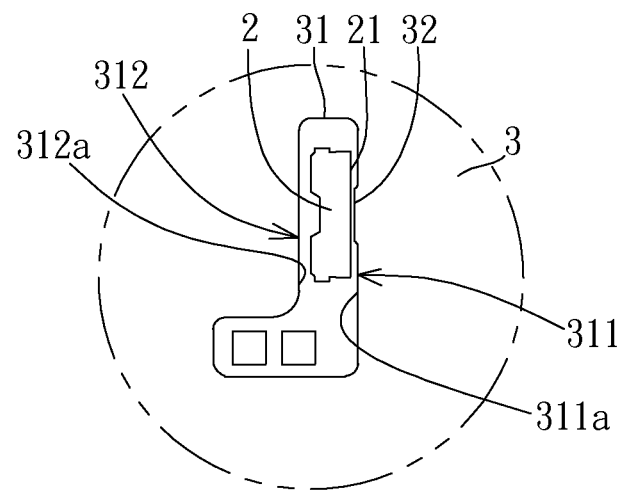
FIG. 3 is an enlarged view of the area "A" of FIG. 2, showing the relative position of the light source and the through hole of the light guide plate on the right side.

As shown in FIG. 2 and FIG. 3, for the through holes 31 in the right group, the tongues 321 substantially extend from first edge 311 (i.e. the first lateral surface 311a) which is on the right side of the through hole 31 toward the left side; the light sources 2 in these through holes 31 emit light substantially toward the right side to serve as the backlight for the right half keyboard (i.e. emit light toward the direction indicated by the arrow "RR" of FIG. 2).

As shown in FIG. 2 and FIG. 4, for the through holes 31 in the left group, the tongue 321 substantially extends from the first edge 311 (i.e. the first lateral surface 311a) which is on the left side of the through hole 31 toward the right side; the light sources 2 in these through holes 31 emit light substantially toward the left side to serve as the backlight for the left half keyboard (i.e. emit light toward the direction indicated by the arrow "LR" of FIG. 2).

Figure 6:
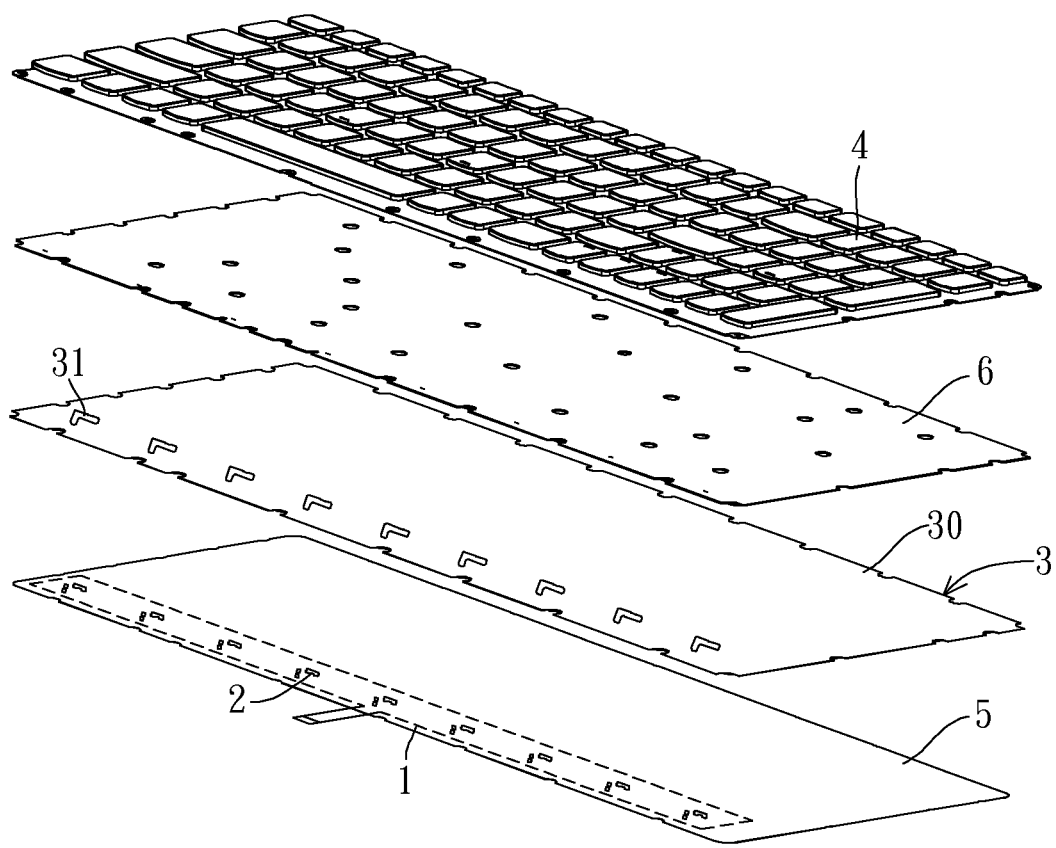
FIG. 6 is an exploded view of a second embodiment of the light emission module of the invention, wherein the light source is disposed in the through hole at the side portion of the light guide plate.
Figure 7:
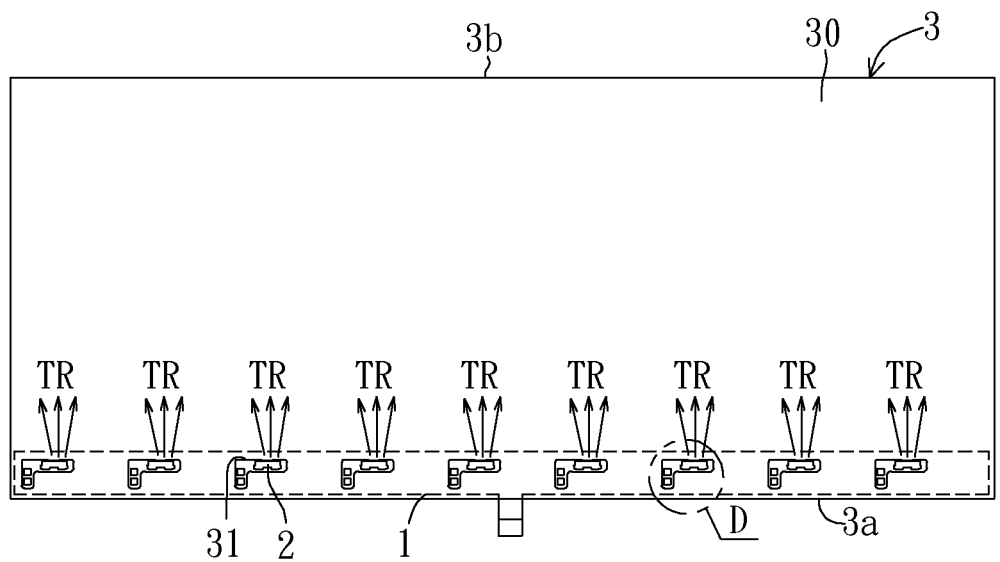
FIG. 7 is a schematic view of the second embodiment of the light emission module of the invention, showing the light source penetrating into the light guide plate.
Figure 8:
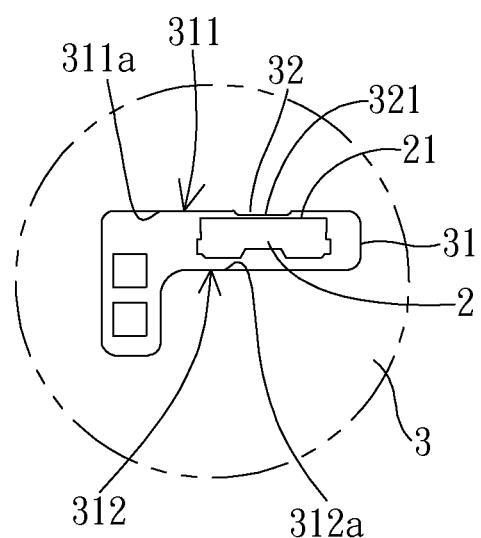
FIG. 8 is an enlarged view of the area "D" of FIG. 7, showing the relative position of the light source and the light guide plate.

In the second embodiment of FIG. 6 to FIG. 8, the light guide plate 3 has a plurality of through holes 31 on the side portion. As shown in FIG. 7, the light guide plate 3 has a plate body 30, wherein the plate body 30 has a first side 3a and a second side 3b opposite to each other. That is, the first side 3a and the second side 3b are two opposite sides of the plate body 30, such as the bottom side and the top side, respectively. Each through hole 31 is disposed close to the first side 3a that is the bottom edge of the light guide plate 3, and the light source 2 in each through hole 31 emits light substantially toward the second side 3b on the top edge of the light guide plate 3 (i.e. toward the direction indicated by the arrow "TR" of FIG. 7). The tongue 32 in each through hole 31 extends substantially from the first edge 311 (i.e. the first lateral surface 311a) of the through hole 31 toward a direction away from the second side 3b (i.e. extends from the first lateral surface 311a toward the first side 3a), so that the flat end surface 321 is closer to the first side 3a than the first edge 311 is, and the second edge 312 is closer to the first side 3a than the first edge 311 is). That is, each of the light sources 2 emits light substantially toward the direction "TR", and each of the tongues 32 substantially extends opposite to the direction "TR".

Figure 14:
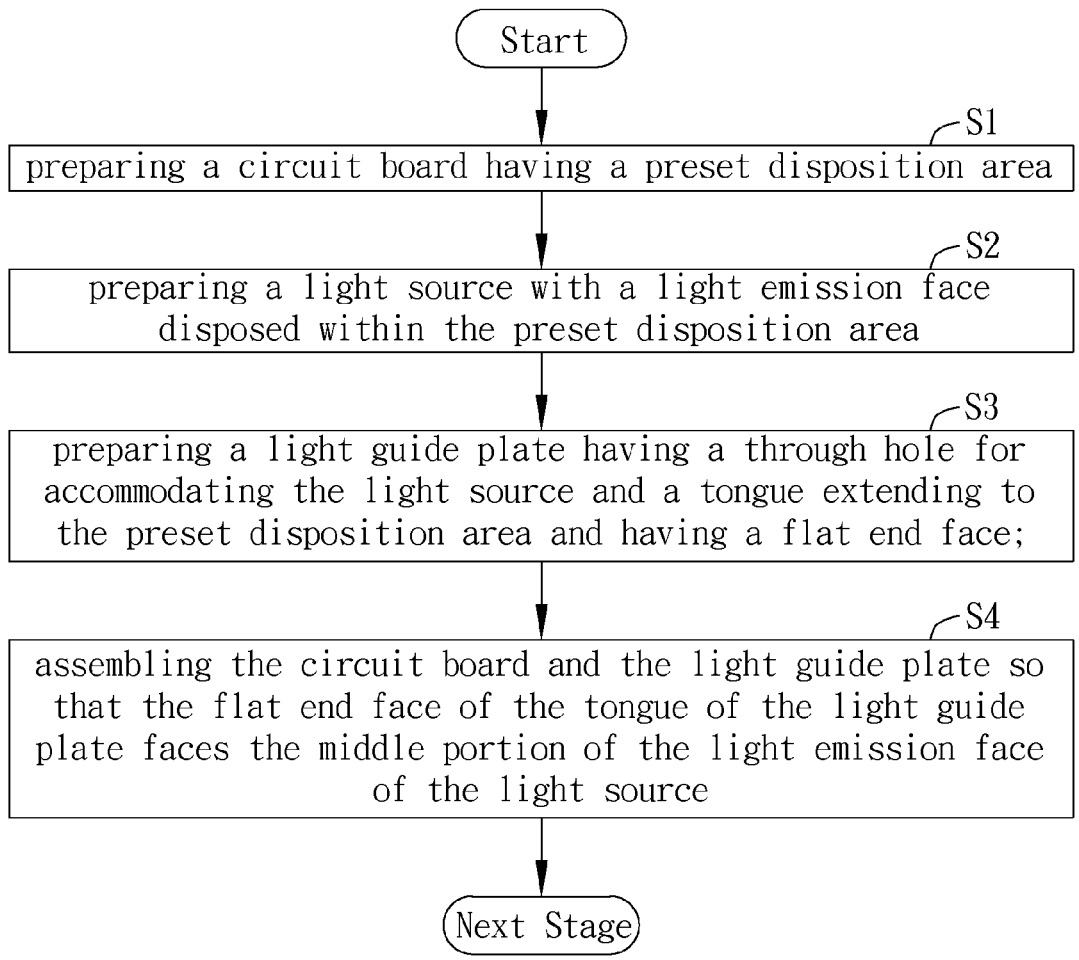
FIG. 14 is a flow chart of the manufacturing method of the light emission module of the invention.

Referring to FIG. 14, the manufacturing method of the light emission module of the invention includes the following steps.

Figure 9A:
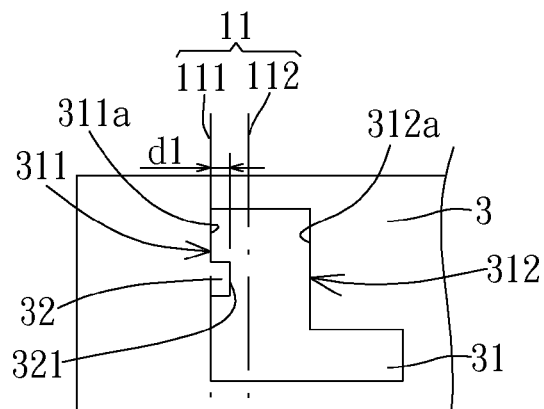
FIGS. 9A to 9D are schematic views of the light emission module of the invention, showing the dimension relationship and the relative position of the light emission surface of the light source disposed on a first position and the tongue of the light guide plate, wherein in FIG. 9D, the flat end surface of the tongue is closely in contact with the light emission surface of the light source.
Figure 10A:
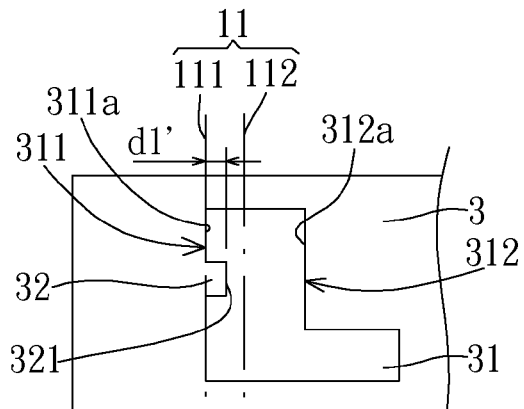
FIGS. 10A to 10C are schematic views of the light emission module of the invention, showing the dimension relationship and the relative position of the light emission surface of the light source disposed on a second position and the tongue of the light guide plate, wherein in FIG. 10C, the flat end surface of the tongue is not closely in contact with the light emission surface of the light source.
Figure 9B:
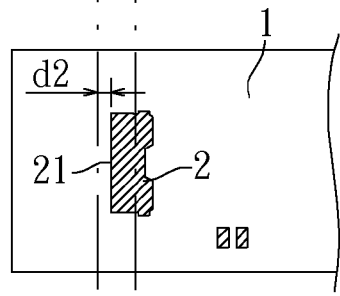
Figure 10B:
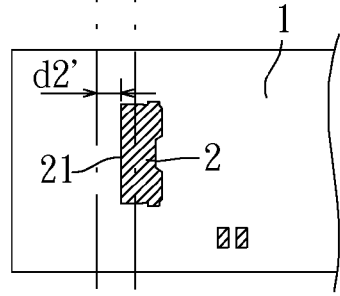
Figure 9C:
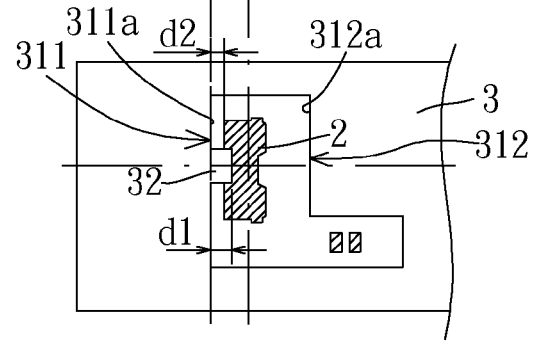

In step S1, a circuit board having a preset disposition area is prepared. As shown in FIG. 9B and FIG. 10B, the preset disposition area 11 of the circuit board 1 prepared in step S1 is defined with a first boundary 111 and a second boundary 112.

In step S2, a light source is prepared in a manner that the soldering position of the light source on the circuit board is within a preset soldering area, so that the light emission surface of the light source is within the preset disposition area of step S1. As shown in FIG. 9B, the first light source 2 is soldered on a first position of the circuit board 1, wherein on the first position, the distance between the light emission surface 21 of the first light source 2 and the first lateral surface 111 is "d2". As shown in FIG. 10B, the second light source 2 is soldered on a second position of the circuit board 1, wherein on the second position, the distance between the light emission surface 21 of the second light source 2 and the first lateral surface 111 is "d2'". From the above description, it can be seen that the soldering positions of the light sources on the circuit board may be different due to the limitation of soldering accuracy of SMT equipment.

In step S3, a light guide plate having a through hole and a tongue is prepared, wherein the through hole is provided for accommodating the light source; the tongue extends to the light emission surface of the light source and has a flat end surface. As shown in FIG. 9A and FIG. 10A, the light guide plate 3 prepared in step S3 is located over the circuit board 1, wherein the first lateral surface 311a (i.e. the first edge 311) of the through hole 31 faces the light emission surface 21, and the first edge 311 is supposed to be aligned with the first boundary 111 of the preset disposition area 11. The tongue 32 extends from the first lateral surface 311a toward the second lateral surface 312a (i.e. extends along a direction from the first boundary 111 toward the second boundary 112) to enter the preset disposition area 11 (i.e. to overlap the preset disposition area 11). The tongue 32 has a flat end surface 321 at its tail end. Though in FIG. 9A the extension length of the tongue 32 is marked as "d1", and in FIG. 10a the extension length of the tongue 32 is marked as "d1'", the extension lengths of the tongue 32 in FIG. 9A and FIG. 10A are the same, so the extension length "d1" is equal to the extension length "d1'". That is, the extension length "d1" is the distance between the first lateral surface 311a and the flat end surface 321.

In step S4, the circuit board and the light guide plate are assembled by the assembly jig, so that the flat end surface of the tongue of the light guide plate faces the middle portion of the light emission surface of the light source. Under an ideal circumstance, when each of the light sources on the circuit board is accurately soldered on the preset soldering position, the distance between the light emission surface of the light source and the light guide plate is equal to the lateral extension length of the tongue. Therefore, after the circuit board and the light guide plate are assembled in step S4, the flat end surface of the tongue just touches the light emission surface of the light source and the tongue will not deform because of no pressing force from the light source. As such, the light from the middle portion of the light emission surface of the light source can directly get into the light guide plate from the flat end surface, so as to greatly reduce the loss of light energy provided by the light source 2 before the light enters the light guide plate 3.

Due to the limitation of soldering accuracy of the SMT equipment, the actual positions of the light emission surfaces of the light sources on the same circuit board may have different distances to the first boundary 111. As shown in FIG. 9A to FIG. 9D, after soldering, the light emission surface 21 of the first light source 2 may be actually disposed on the first position and has a distance "d2" from the first boundary 111 which is smaller than the extension length "d1" of the tongue 32. Since the first edge 311 is aligned with the first boundary 111, the lateral extension length "d1" of the tongue 32 is larger than the distance "d2" between the first lateral surface 311a and the light emission surface 21 of the light source 2. In other words, before circuit board 2 and the light guide plate 3 are assembled (i.e. the tongue 32 is not deformed), the distance "d1" between the flat end surface 321 and the first lateral surface 311a is larger than the distance "d2" between the first lateral surface 311a and the light emission surface 21 of the light source 2. When the circuit board 1 and the light guide plate 3 are assembled by means of the assembly jig in step S4, the tongue 32 will deform or become shortened due to the pressing force of the assembly jig and the light source 2, making the flat end surface 321 touch against the light emission surface 21. That is, after the light guide plate 3 and the circuit board 2 are assembled, the tongue 32 is deformed so that the distance between the flat end surface 321 and the first lateral surface 311a is equal to the distance (i.e. d3) between the first lateral surface 311a and the light emission surface 21, and the flat end surface 321 engages with the light emission surface 21. When the flat end surface 321 engages with the light emission surface 21, the distance between the flat end surface 321 and the light emission surface 21 is substantially zero. It is noted that the circuit board 1 should have suitable holding mechanism to provide sufficient holding force to the light source 2, wherein the holding force provided is strong enough to support the deformation of the tongue 32 and maintain the close contact of the light emission surface 21 and the flat end surface 321, so as to ensure the light source 2 not to detach from the circuit board 1.

Figure 9D:
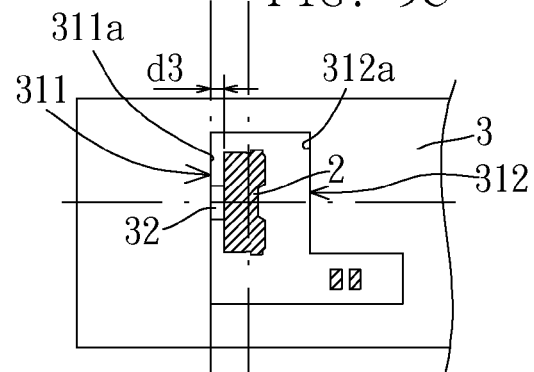

As shown in FIG. 9D, after the circuit board 1 and the light guide plate 3 are assembled, the middle portion of the flat end surface 321 is preferably aligned with the middle portion of the light emission surface 21, and the middle portion of the light emission surface 21 of the light source 2 faces and engages with the flat end surface 321 of the tongue 32 of the light guide plate 3. As such, substantially no gap exists between the light emission surface 21 of the light source 2 and the tongue 32 of the light guide plate 3; therefore, light from the middle portion of the light emission surface 21 of the light source 2 can directly enter the light guide plate 3 from the flat end surface 321, so as to greatly reduce the loss of light energy provided by the light source 2 before the light enters the light guide plate 3.

Preferably, as shown in FIG. 4 and FIG. 5, the width "W1" of the flat end surface 321 is smaller than the width "W2" of the light emission surface 321 of the light source 2 to reduce the deformation resistance of the tongue 32, so that the tongue 321 can smoothly deform, making the flat end surface 321 touch against the light emission surface 21. More preferably, the width "W1" of the flat end surface 321 is substantially equal to or smaller than half of the width "W2" of the light emission surface 21 of the light source 2. In the invention, the width "W1" of the flat end surface 321 is larger than 1 mm to promote the transmittance of the tongue 32 and prevent the crack of the tail end.

Alternatively, if the coefficient of elasticity is smaller (i.e. the deformation resistance is smaller), the tongue 32 can extend laterally to the second boundary 112, or even beyond the second boundary 112 to ensure that the flat end portion 321 engages with the light emission surface 21. Consequently, the lateral extension length of the tongue 32 is inverse proportional to the coefficient of elasticity.

Figure 10C:
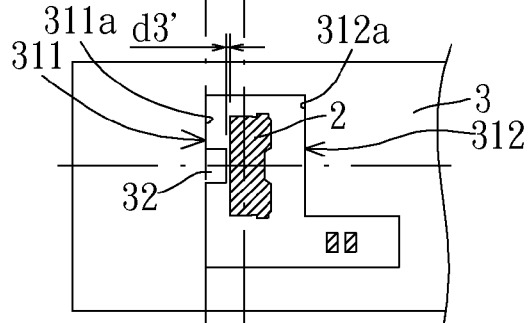

As shown in FIG. 10A and FIG. 10C, after soldering, the light emission surface 21 of the second light source 2 may be actually disposed on the second position and has a distance "d2'" from the first boundary 111 which is greater than the extension length "d1'" of the tongue 32. Since the first edge 311 is aligned with the first boundary 111, the lateral extension length "d1'" of the tongue 32 is smaller than the distance "d2'" between the first lateral surface 311a and the light emission surface 21 of the light source 2. In other words, for the non-deformed tongue 32, the distance "d1'" between the flat end surface 321 and the first lateral surface 311a is smaller than the distance "d2'". Therefore, when the circuit board 1 and the light guide plate 3 are assembled by means of the assembly jig in step S4, the flat end surface 321 of the tongue 32 is spaced apart from the light emission surface 21 of the light source 2 by the distance "d3'", and under no pressing force, the flat end surface 321 of the tongue 32 faces the light emission surface 21 of the light source 2. That is, in the case that the distance (i.e. d1') between the first lateral surface 311a and the flat end surface 321 is smaller than the distance (e.g. d2') between the first lateral surface 311a and the light emission surface 21, the distance (i.e. d3) between the flat end surface 321 and the light emission surface 21 is smaller than the distance (e.g. d2') between the first lateral surface 311a and the light emission surface 21, so that the light guide plate 3 can receive light from the light emission surface 21 of the light source 2 by the closely adjacent flat end surface 321 of the tongue 32, so as to reduce the distance that the light from the light emission surface 21 travels in air (i.e. the distance that the light travels between the light source and the flat end surface 321 of the tongue 32) and to greatly reduce the loss of light energy provided by the light source 2 before the light enters the light guide plate 3.

Figure 11:
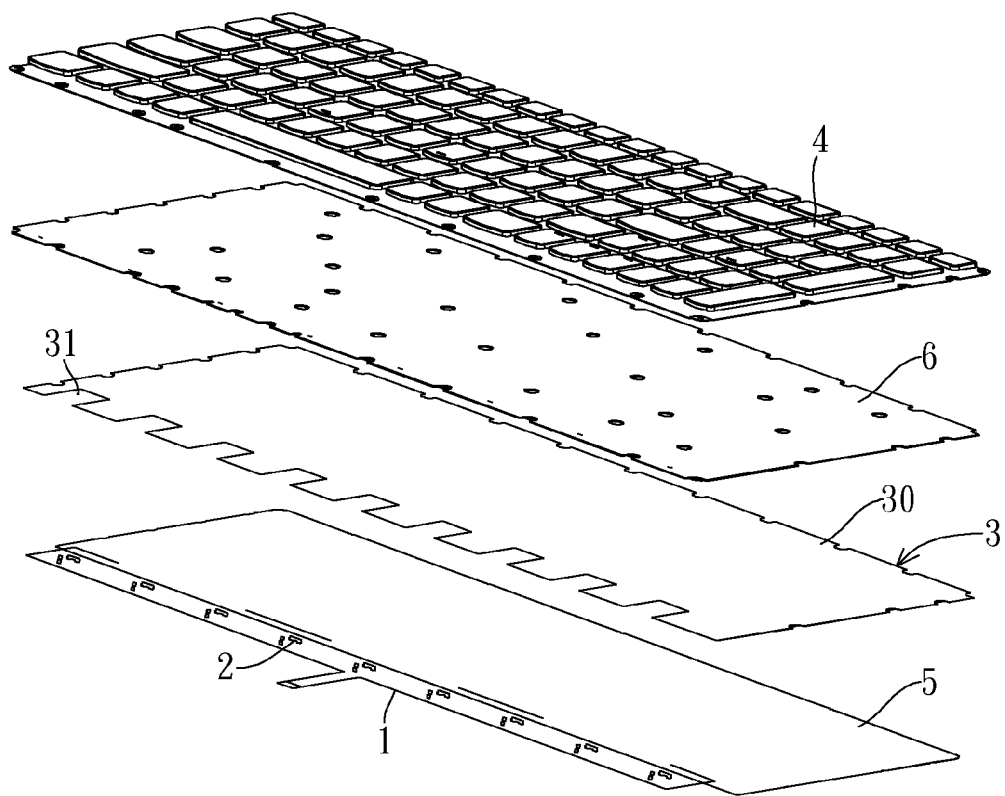
FIG. 11 is an exploded view of a third embodiment of the light emission module of the invention, wherein the light source is disposed in the through hole at the side portion of the light guide plate.
Figure 12:
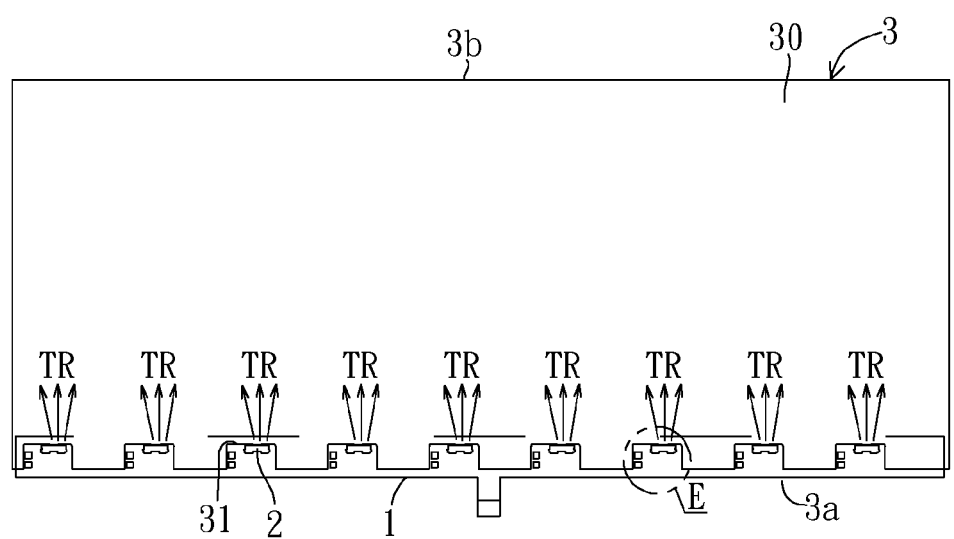
FIG. 12 is a schematic view of the third embodiment of the light emission module of the invention, showing the light source penetrating into the light guide plate.
Figure 13:
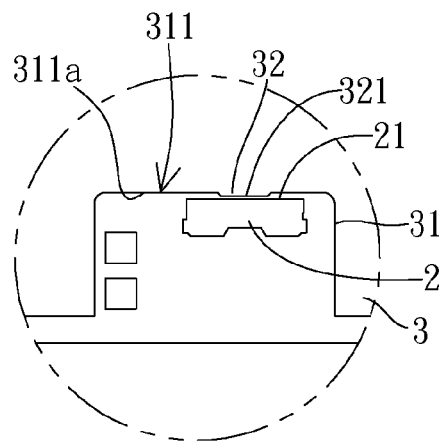
FIG. 13 is an enlarge view of the area "E" of FIG. 12, showing the relative position of the light source and the light guide plate.

In the third embodiment shown in FIG. 11 to FIG. 13, the light source 2 is disposed on one side 3a of the light guide plate 3, and the through hole 31 is constituted by the side wall that extends along three sides of the light source 2 to present a substantial "n" shape. That is, the light guide plate 3 is recessed from the first side 3a to form the through hole 31. However, in other embodiments, the light guide plate can be disposed with no through hole, and the light guide plate extends from one edge toward the light emission surface of the light source to form the tongue for receiving the light from the light emission surface of the light source.

The light emission module and the light guide plate and the manufacturing method thereof provided by the invention utilizes the tongue of the light guide plate that extends close to or engages with the light emission surface of the light source, so as to reduce the gap between the light emission surface of the light source and the light guide plate and to reduce the loss of light energy during the light traveling in air. Therefore, the loss of light energy of the light source can be improved, and the intensity of light that is emitted from the light source and then received by the light guide plate will meet expectation. Consequently, the overall lighting effect of the light emission module is promoted and suitable for the backlit keyboard or other lighting or backlit devices.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A method of manufacturing a light emission module, comprising:
   preparing a circuit board;
   disposing a light source on the circuit board, the light source having a light emission surface;
   preparing a light guide plate to be located over the circuit board, the light guide plate having a first lateral surface and a tongue, the first lateral surface facing the light emission surface, the tongue protruding from the first lateral surface and having a flat end surface for receiving the light emitted from the light emission face, the flat end surface having a width smaller than a width of the light emission surface of the light source; and
   assembling the circuit board and the light guide plate, so that a middle portion of the light source faces the flat end surface of the tongue of the light guide plate.

2. The method of claim 1, wherein the width of the flat end surface is smaller than a half of the width of the light emission surface of light source.

3. The method of claim 1, wherein the tongue is deformable, the tongue originally extends beyond the light emission surface, and after assembly, the tongue is deformed and shorten to make the flat end surface engage with the light emission surface.

4. A light emission module, comprising:
   a circuit board;
   a light source disposed on the circuit board, the light source having a light emission surface for emitting light;
   a light guide plate disposed over the circuit board, the light guide plate having a first lateral surface and a tongue protruding from the first lateral surface, the tongue having a flat end surface at its tail end, the first lateral surface and the light emission surface having a first distance therebetween, and the flat end surface and the light emission surface having a second distance therebetween, and the second distance being smaller than the first distance;
   wherein the flat end surface has a first width and the light emission surface has a second width, and the first width is smaller than the second width;
   wherein the flat end surface faces a middle portion of the light emission surface to receive light emitted from the light emission surface, so that a distance for the light emitted from the middle portion of the light emission surface traveling in air to the light guide plate is smaller than the first distance.

5. The light emission module of claim 4, wherein the flat end surface engages with the middle portion of the light emission surface, so that the second distance is substantially zero.

6. The light emission module of claim 4, wherein the flat end surface and the light emission surface have a gap therebetween, and the flat end surface is parallel to the light emission surface.

7. The light emission module of claim 4, wherein a middle portion of the flat end surface is aligned with the middle portion of the light emission surface.

8. The light emission module of claim 4, wherein the tongue is a quadrilateral; the flat end surface is on a top side of the tongue and parallel to the first lateral surface; a bottom side of the tongue is connected to the first lateral surface.

9. The light emission module of claim 4, wherein the tongue is deformable; before the light guide plate and the circuit board are assembled, the distance between the flat end surface and the first lateral surface is larger than the first distance; after the light guide plate and the circuit board are assembled, the distance between the flat end surface and the first lateral surface is equal to the first distance and the flat end surface engages with the light emission surface.

10. The light emission module of claim 9, wherein the circuit board has a holding mechanism to provide a holding force to the light source, the holding force is sufficient to support the deformation of the tongue to maintain close contact between the light emission surface and the flat end surface.

11. The light emission module of claim 4, wherein the light guide plate further has a through hole; the first lateral surface is a sidewall of the through hole, the through hole further has a second lateral surface opposite to the first lateral surface; the tongue extends from the first lateral surface toward the second lateral surface; the light source is disposed in the through hole.

12. The light emission module of claim 4, wherein the light emission module further comprises a plurality of light sources, and the plurality of light sources are divided into a left group and a right group; the light guide plate further comprises a plurality of tongues corresponding to the plurality of light sources respectively
for the light sources designated in the left group, the tongues substantially extend from left to right, and the light sources emit light toward left side; and
for the light sources designated in the right group, the tongues substantially extend from right to left, and the light sources emit light toward right side.

13. The light emission module of claim 4, wherein the light emission module further comprises a plurality of light sources; the light guide plate further comprises a plurality of tongues; each of the light sources emits light substantially toward a first direction; each of the tongues substantially extends opposite to the first direction.

14. The light emission module of claim 4, wherein the tongue is a trapezoid; the flat end surface is on a top side of the tongue and parallel to the first lateral surface; the tongue has a bottom side connected to the first lateral surface; the tongue has two lateral sides; each lateral side outwardly expands from the flat end surface toward the first lateral surface so that a width of the bottom side of the tongue is larger than the width of the flat end surface.

15. The light emission module of claim 4, wherein the flat end surface has a width is substantially equal to a half of the width of the light emission surface.

16. The light emission module of claim 4, wherein the light guide plate further comprises a through hole, and the through hole has an edge; the light source is received within the through hole, and the first lateral surface is formed on the edge.

17. A light guide plate, comprising:
a plate body having a first side and a second side opposite to each other, the plate body having a through hole and the through hole having a first edge; and
a tongue extending from the first edge and away from the second side,
wherein the tongue has a flat end surface and the flat end surface is closer to the first side than the first edge is; the flat end surface is parallel to the first edge and configured to receive light.

18. The light guide plate of claim 17, wherein the through hole is formed at a middle portion of the plate body and further has a second edge opposite to the first edge, and the tongue extends from the first edge toward the second edge.

19. The light guide plate of claim 17, wherein the plate body is recessed from the first side to form the through hole.

20. The light guide plate of claim 17, wherein the tongue has two lateral sides and a bottom side where the tongue connects the first edge; each of lateral sides outwardly expands from the flat end surface toward the first edge so that the width of the bottom side is larger than the width of the flat end surface to construct the tongue with a trapezoid profile.

* * * * *